United States Patent
Jeannot et al.

(10) Patent No.: US 9,663,900 B2
(45) Date of Patent: May 30, 2017

(54) MULTI-PLY TISSUE PAPER PRODUCT AND METHOD FOR MANUFACTURING THE SAME

(71) Applicant: SCA TISSUE FRANCE, Saint-Ouen (FR)

(72) Inventors: Sébastien Jeannot, Holtzwihr (FR); Emmanuelle Kientz, Wickerschwihr (FR); Marie Bertin-Château, Uffholtz (FR)

(73) Assignee: SCA TISSUE FRANCE, Saint-Ouen (FR)

( * ) Notice: Subject to any disclaimer, the term of this patent is extended or adjusted under 35 U.S.C. 154(b) by 0 days.

(21) Appl. No.: 14/417,843

(22) PCT Filed: Aug. 2, 2013

(86) PCT No.: PCT/IB2013/001702
§ 371 (c)(1),
(2) Date: Jan. 28, 2015

(87) PCT Pub. No.: WO2014/020424
PCT Pub. Date: Feb. 6, 2014

(65) Prior Publication Data
US 2015/0225903 A1   Aug. 13, 2015

(30) Foreign Application Priority Data
Aug. 3, 2012 (EP) .................................... 12305973

(51) Int. Cl.
*D21H 27/40* (2006.01)
*B31F 1/07* (2006.01)
(Continued)

(52) U.S. Cl.
CPC .......... *D21H 27/004* (2013.01); *A47K 10/16* (2013.01); *B31F 1/07* (2013.01); *B32B 29/005* (2013.01);
(Continued)

(58) Field of Classification Search
CPC ................ B31F 1/07; B31F 2201/0761; B31F 2201/0774; Y10T 428/24612;
(Continued)

(56) References Cited

U.S. PATENT DOCUMENTS 5,702,571 A * 12/1997 Kamps .................. A47K 10/16
162/109
6,733,866 B2 * 5/2004 Muller ...................... B32B 3/28
428/154
(Continued)

FOREIGN PATENT DOCUMENTS

CN       1328610 A      12/2001
DE   GB 2376436 A  * 12/2002   ............... B13F 1/07
(Continued)

OTHER PUBLICATIONS

English language translation of a Chinese Office Action dated Feb. 3, 2016 issued in corresponding Chinese patent application No. 201380041323.9 (10 pages).
(Continued)

*Primary Examiner* — Jose Fortuna
(74) *Attorney, Agent, or Firm* — Drinker Biddle & Reath LLP

(57) ABSTRACT

A multi-ply tissue paper product includes at least two plies made of tissue paper base-sheet with at least one outer ply being a structured outer ply produced by a structuring manufacturing method. The structured outer ply includes a microstructure pattern on substantially at least 80% of the structured outer ply surface. The microstructure pattern is
(Continued)

applied by micro-embossing during a converting operation. The structured outer ply is chosen from a through air dried ply produced by a through air drying (TAD) manufacturing method; a dried ply produced by an advanced tissue molding system (ATMOS), or a dried ply produced by a structured tissue technology (SST) manufacturing method. The microstructure pattern includes a first series of protuberances having a density ranging from approximately 30 to 100 protuberances/cm². The softness property of the structured outer ply is adjusted during a micro-embossing step.

20 Claims, 6 Drawing Sheets

(51) Int. Cl.
    B32B 29/06      (2006.01)
    D21H 27/00      (2006.01)
    D21H 27/02      (2006.01)
    D21H 27/30      (2006.01)
    A47K 10/16      (2006.01)
    B32B 29/00      (2006.01)
    B32B 29/08      (2006.01)
(52) U.S. Cl.
    CPC .............. B32B 29/06 (2013.01); B32B 29/08
            (2013.01); D21H 27/002 (2013.01); D21H
            27/02 (2013.01); D21H 27/30 (2013.01); B31F
                2201/0733 (2013.01); B31F 2201/0738
            (2013.01); B31F 2201/0761 (2013.01); B31F
                2201/0787 (2013.01); B32B 2250/26
            (2013.01); B32B 2432/00 (2013.01); B32B
                                    2555/00 (2013.01)
(58) Field of Classification Search
    CPC ......... Y10T 156/1023; Y10T 156/1039; Y10T
                428/24463; Y10T 428/24479; D21H
                27/40; D21H 27/02; D21H 27/002; D21H
                27/30; D21H 27/004; D21H 1/02; A47K
                10/16; B32B 2250/26; B32B 29/06; B32B
                29/08; B32B 29/00; B32B 3/28; D21F
                11/006; Y10S 428/906
    USPC ........ 162/109, 117, 118, 123–133; 428/34.2,
                    428/172, 156, 537.5; 156/209, 219;
                                    264/284–286
    See application file for complete search history.

(56)            References Cited

U.S. PATENT DOCUMENTS 6,884,492   B2 *  4/2005   Basler ................... A47K 10/16
                                                            156/209
    D508,785    S  *  8/2005   Jeannot .......................... D5/25
    6,942,755   B2 *  9/2005   Basler ..................... B31F 1/07
                                                            156/209
    7,494,564   B2 *  2/2009   Basler ..................... B31F 1/07
                                                            162/117
    7,846,531   B2 * 12/2010   Basler ..................... B31F 1/07
                                                            156/163
    8,012,311   B2 *  9/2011   Jeannot ................... B31F 1/07
                                                            162/205
    8,114,250   B2 *  2/2012   Jeannot ................... B31F 1/07
                                                            162/109

8,246,885   B2 *  8/2012   Jeannot ................... B31F 1/07
                                                            156/209
    8,323,453   B2 * 12/2012   Jeannot ................... B31F 1/07
                                                            162/109
    8,999,095   B2 *  4/2015   Sauter .................... B31F 1/07
                                                            156/209
    9,090,040   B2 *  7/2015   Sauter .................... B31F 1/07
    9,267,240   B2 *  2/2016   Lee ...................... D21H 7/002
    9,309,627   B2 *  4/2016   Miller ................... D21H 21/18
    9,352,527   B2 *  5/2016   Barredo ................. A47K 10/16
    2003/0008109 A1 *  1/2003   Basler .................... B31F 1/07
                                                            428/156
    2003/0026953 A1 *  2/2003   Muller .................... B32B 3/28
                                                            428/174
    2004/0023003 A1 *  2/2004   Basler .................... B31F 1/07
                                                            428/172
    2004/0074594 A1 *  4/2004   Basler ................... A47K 10/16
                                                            156/184
    2004/0231813 A1 * 11/2004   Basler .................... B31F 1/07
                                                            162/123
    2005/0103456 A1 *  5/2005   Hein ..................... B31F 1/07
                                                            162/117
    2007/0122595 A1 *  5/2007   Basler .................... B31F 1/07
                                                            428/174
    2010/0006247 A1 *  1/2010   Jeannot ................... B31F 1/07
                                                            162/109
    2010/0009125 A1 *  1/2010   Jeannot ................... B31F 1/07
                                                            428/172
    2010/0021696 A1 *  1/2010   Hill ...................... B31F 1/07
                                                            428/187
    2011/0290423 A1 * 12/2011   Jeannot ................... B31F 1/07
                                                            156/436
    2013/0029105 A1 *  1/2013   Miller ................... D21H 21/18
                                                            428/172
    2013/0220151 A1 *  8/2013   Sauter .................... B31F 1/07
                                                            101/28
    2015/0184342 A1 *  7/2015   Saas ...................... B31F 1/07
                                                            162/132
    2015/0225903 A1 *  8/2015   Jeannot ................... B31F 1/07
                                                            162/132
    2015/0240427 A1 *  8/2015   Miller .................... B31F 1/126
                                                            162/111
    2016/0002861 A1 *  1/2016   Goulet .................... B21H 7/42
                                                            162/111
    2016/0115648 A1 *  4/2016   Lee ...................... D21H 27/002
                                                            428/165
    2016/0186380 A1 *  6/2016   Miller .................... D21H 1/02
                                                            162/111

FOREIGN PATENT DOCUMENTS

DE       WO 02103112   A1 * 12/2002   .............. B31F 1/07
    DE       WO 2007016941 A1 *  2/2007   ............. D21H 27/40
    FR          2733522    A1 * 10/1996   ............. D21F 5/182
    FR          EP 2664451 A1 * 11/2013   .............. B31F 1/07
    FR          EP 2692948 A1 *  2/2014   .............. B31F 1/07
    FR       WO 2014020424 A1 *  2/2014   .............. B31F 1/07
    FR       WO 2014020424 A8 *  3/2015   .............. B31F 1/07
    WO         WO-02103112 A1    12/2002
    WO       WO-2011/035803 A1    3/2011
    WO       WO-2011/069532 A1    6/2011
    WO       WO 2012/087211 A1    6/2012

OTHER PUBLICATIONS

Australian Patent Examination Report No. 1 isssued Sep. 29, 2015 in corresponding Australian patent application No. 2013298266 (2 pages).

* cited by examiner

MULTI-PLY TISSUE PAPER PRODUCT AND METHOD FOR MANUFACTURING THE SAME

CROSS-REFERENCE TO PRIOR APPLICATION

This application is a §371 National Stage Application of PCT International Application No. PCT/IB2013/001702 filed Aug. 2, 2013, which claims priority to EP 12305973.5 filed Aug. 3, 2012, each of which is incorporated herein in its entirety.

TECHNICAL FIELD

The disclosure relates to a multi-ply tissue paper product. Additionally, the disclosure relates to a method for manufacturing a multi-ply tissue paper product. Such a multi-ply tissue paper product finds a particular, though non exclusive, application in the tissue paper industry. Tissue paper may be used for sanitary or domestic purposes. As an example, a web of tissue paper is wound onto a core for the purpose of manufacturing paper towel, toilet tissue rolls, facial rolls, bathroom tissue, wiping tissue or kitchen tissue rolls. As another example, a web of tissue paper is folded for the purpose of manufacturing facial tissue, handkerchiefs or bathroom tissue.

BACKGROUND

In the following, a tissue paper product relates to an absorbent paper based on cellulose wadding which is also called tissue paper base-sheet in this field of technology. A typical absorbent paper has a low basis weight, in the range from 10 to 50 g/m$^2$.

The tissue paper can be produced from paper fibers according to the Conventional Wet Press (CWP) manufacturing method, or by the Through Air Drying (TAD) manufacturing method, or any alternative manufacturing method (e.g. Advanced Tissue Molding System ATMOS of the company Voith, or Structured Tissue Technology SST of the company Metso Paper). The paper fibers can be produced from virgin and/or recycled paper pulp raw material.

The CWP manufacturing method includes the steps of:
pressing and drying the wet paper fibers as a sheet on a large-diameter, heated cylinder (also called Yankee dryer); and
subsequently detaching and creping the sheet of dried paper fibers by means of a metal blade applied against said cylinder, across its direction of rotation.

The creping operation creates undulations in the sheet across its direction of travel. The creping operation increases the thickness of the sheet, and confers elasticity and gives touch properties to the sheet.

The TAD manufacturing method includes the steps of:
molding the sheet of wet paper fibers on a fabric; and
subsequently drying the sheet, at least partly, by means of a current of hot air passing through it.
Subsequently, the dried sheet may be creped.

Once, the tissue paper has been manufactured, a distinct manufacturing operation called converting operation is necessary to form the end product (i.e. the paper towel, toilet tissue rolls, bathroom tissue, wiping tissue, kitchen tissue rolls, handkerchiefs, etc. . . . ). During the converting operation, several of such sheets, also called plies, can be combined to form said end product.

It is possible to combine several plies together to confer particular properties on a sheet such as thickness, bulkiness, softness, and strength.

Several plies may be combined together by a combining operation of a chemical nature (e.g. by adhesive bonding), or of a mechanical nature (e.g. by knurling or embossing), or a combination of both. During adhesive bonding, a film of adhesive is deposited over some or all of the surface of one of the plies, then the adhesive-treated surface is placed in contact with the surface of at least one other ply. During the mechanical combination, the plies may be combined by knurling, or by compression, or by embossing. Embossing is a process by which a raised or depressed design is produced, generally by pressure between engraved rolls or plates or between an engraved roll or plate and an elastic or a deformable supporting surface. It results in a CWP ply having a particular relief or indentation. The thickness of the CWP ply or of the multiple plies is increased after embossing compared with its initial thickness.

In order to produce very soft multi-ply tissue paper product, for example toilet tissue comprising two TAD plies or TAD ply combined with one CWP ply, it was until now assumed that:
the TAD ply to be used should be as soft and smooth as possible,
the TAD ply should not be embossed or at least embossed as little as possible so as to preserve its properties, in particular thickness and strength during the converting operation, and
the TAD ply is already structured as a consequence of the manufacturing process (a face of the TAD ply reproduces the structure of the fabric supporting the wet paper fibers), and thus conferring an additional pattern to the TAD ply is not considered as desirable.

In order to achieve a TAD ply of high softness and suppleness, it was commonly accepted to reduce the strength of the TAD tissue (for a given grammage) during the TAD manufacturing process (TAD papermaking machine), for example below 40 N/m CDT or 110 N/m MDT. Further, below a determined strength, the breaks of the TAD tissue increase significantly during the TAD manufacturing process. This may even reach the point where it is no longer possible to produce the TAD tissue. Furthermore, it is possible to reduce the number of TAD tissue breaks by reducing the speed of production of the TAD tissue by the TAD papermaking machine. Furthermore, it is possible to increase the TAD tissue strength by increasing the grammage. However, these solutions are difficult to implement within the frame of an industrial production of TAD tissue without negatively affecting productivity and cost of production.

The document WO 2011/069532 describes a fibrous product, especially tissue paper product, nonwoven product or a hybrid thereof, preferably hygiene and cleaning product, has at least one ply, the surface of which is partly covered with an embossing pattern, and is characterized in that the pattern comprises at least one first zone being micro-embossed with at least 30 embossing depressions per cm$^2$, preferably 30 to 160 embossing depressions/cm$^2$, more preferably 30 to 120 embossing depressions/cm$^2$ and most preferably 45 to 100 depressions/cm$^2$, forming a background embossing area, a plurality of second zones being unembossed and forming a motive element and in addition to the second zones at least one third zone being largely surrounded by linear depressions. The document also describes an embossing roll and an embossing device including a method for manufacturing such fibrous products. In this document, the micro-embossed zone results either by micro-embossing a creped tissue paper during a converting process or by using the intrinsic effect linked to the TAD process during the papermaking process.

The document WO 02/103112 describes a multi-ply tissue paper product and a method for producing same. The multi-ply tissue paper comprises at least three embossed plies of paper, wherein a first outer ply has a first microstructure pattern with first protuberances with a density of more than 40 protuberances/cm$^2$. The second outer ply is provided with a second microstructure pattern also having a density of second protuberances of more than 40 protuberances/cm$^2$. A middle ply is sandwiched between the first outer ply and the second outer ply and has a third structure pattern being an embossing pattern with a density of less than 40 protuberances/cm$^2$. All three plies are ply bonded together after the first outer ply, the second outer ply and the middle ply have been structured separately. In this document, the TAD process is presented as an alternative to the micro-embossing of a tissue ply produced by a conventional wet press CWP manufacturing method.

The document WO 2011/035803 describes a fibrous product, especially tissue paper product, non-woven product or a hybrid thereof and preferably hygiene and cleaning product, comprising at least: one top ply with either an embossing pattern forming pillow-like chambers at least partially surrounded by first embossing protuberances or with second embossing protuberances; at least one middle ply embossed in register with the at least one top ply so that either second embossing protuberances of the at least one middle ply nest into the pillow-like chambers of the at least one top ply or second embossing protuberances of the at least one top ply nest into the pillow-like chambers at least partially surrounded by first embossing protuberances of the at least one middle ply; and at least one bottom ply not in register with the at least one top ply and being bonded to both the at least one top ply and the at least one middle ply. In this document, the TAD process is also presented as an alternative to the micro-embossing of a tissue ply produced by a conventional wet press CWP manufacturing method.

Thus, the above mentioned documents generally describe two main alternatives in order to micro-structure a ply, either by micro-embossing a classical CWP type ply or by manufacturing the ply by a TAD process.

There is a need to improve the suppleness and softness of the multi-ply tissue products. Further, this should be obtained in economical or cost effective manner.

SUMMARY

It is desired to propose a multi-ply tissue paper product that overcomes the drawbacks of the prior art multi-ply tissue paper products including a TAD ply, respectively manufacturing method. In particular, it is desirable to improve softness and/or suppleness of multi-ply tissue paper products including at least one TAD ply, while at least maintaining productivity and/or cost of production of multi-ply tissue paper products including at least one TAD ply.

It is further desired to micro-emboss the outer structured TAD ply during the converting operation once dried after the tissue paper has been produced by the paper machine.

According to one aspect, there is provided a multi-ply tissue paper product including at least two plies made of tissue paper base-sheet, at least one outer ply being a structured outer ply produced by a structuring manufacturing method, wherein the structured outer ply includes a microstructure pattern on substantially at least 80% of its surface, said microstructure pattern being applied by micro-embossing during a converting operation, the structured outer ply is chosen among the group of structured ply including a through air dried ply produced by a through air drying TAD manufacturing method, or a dried ply produced by an advanced tissue molding system ATMOS, or a dried ply produced by a structured tissue technology SST manufacturing method, and the microstructure pattern includes a first series of protuberances having a density ranging from approximately 30 to 100 protuberances/cm$^2$.

The at least another ply may be a wet pressed ply produced by a conventional wet press CWP manufacturing method.

The wet pressed ply may also include a microstructure pattern.

The microstructure pattern may include a second series of protuberances forming a decorative pattern, the protuberances of the second series having a height approximately 1 to 3 times greater than the height of the protuberances of the first series.

The microstructure pattern may include a combination of the first series of protuberances or the second series of protuberances with a third series of elongated protuberances having a density ranging from approximately 30 to 100 protuberances/cm$^2$, the elongated protuberances having a length approximately 3 to 20 times longer than the length of the protuberances of the first or second series.

The protuberances of the microstructure patterns may be chosen among the group of microstructure patterns of corrugations, undulations, wave-like profiles, pyramid or cone based micro-embossments, truncated pyramid or truncated cone micro-embossments.

The at least two plies may be bonded together according to a nested or random nested manufacturing process.

According to another aspect, there is provided a method for manufacturing multi-ply tissue paper product including at least two plies made of tissue paper base-sheet, wherein the manufacturing method includes manufacturing at least one outer ply as a structured outer ply produced by a structuring manufacturing method, and further includes micro-embossing the structured outer ply on substantially at least 80% of its surface during a converting operation, the structured outer ply is chosen among the group of structured ply of a through air dried ply produced by a through air drying TAD manufacturing method, or a dried ply produced by an advanced tissue molding system ATMOS, or a dried ply produced by a structured tissue technology SST manufacturing method, and the structured outer ply is micro-embossed between a first cylinder and a second cylinder engraved with a microstructure pattern including a series of protuberances having a density ranging from approximately 30 to 100 protuberances/cm$^2$.

The micro-embossing step may include adjusting a micro-embossing pressure applied to the structured outer ply such as to adjust a softness related property relatively to a strength related property of the structured outer ply in a defined range.

The micro-embossing pressure may range from approximately 10 to 40 kg/cm linear such as to adjust the softness related property of the structured outer ply between approximately 83 and 87 according to measurements provided by an EMTEC tissue softness analyzer and using a specific tissue related algorithm (referred as the QA1 algorithm by EMTEC), and a machine direction strength MDT related property of the structured outer ply between approximately 90 and 130 N/m measured according to the standard EN ISO 12625-4:2005.

The multi-ply tissue paper product manufacturing method may further include manufacturing at least another ply as a wet pressed ply produced by a wet press manufacturing method.

According to a further aspect, there is provided a roll of sheet material including a multi-ply tissue paper product wound onto a core.

According to still a further aspect, there is provided a folded sheet material including a multi-ply tissue paper product cut, stacked and folded into a package.

According to still a further aspect, there is provided a use of a multi-ply tissue paper product as paper towel, toilet tissue rolls, bathroom tissue, wiping tissue, kitchen tissue rolls, facial tissue or handkerchiefs.

The invention enables producing a multi-ply tissue paper product including a TAD outer ply that is softer and results in a better hand-feel compared to prior art multi-ply tissue paper products.

According to the method described, it is possible to adjust during the converting step the softness relatively to the strength of the final tissue product. Incidentally, this enables commonly producing TAD tissue with the same papermaking machine whatever the subsequent final tissue product to be produced during the converting operation, the final tissue product being either a toilet tissue paper with great softness and less strength, or a kitchen tissue paper with less softness and higher strength. In one hand, this enables using a unique TAD papermaking machine resulting in less financial immobilization, and, on the other hand, maintaining the productivity of the TAD papermaking machine that typically produces around 1300 meters of TAD tissue per minute within the frame of an industrial production. Thus, the described method enables producing TAD tissue product with levels of softness, suppleness and strength adapted to the final use of the tissue product in efficient economical conditions. In summary, the described method can be used to manufacture a multi-ply tissue paper product that is softer than prior art multi-ply tissue paper product after the converting operations while maintaining the productivity of the papermaking machine.

The described method is also well adapted to produce facial tissue or handkerchiefs having an excellent softness and being absorbent while reducing the number of plies compared to prior art facial tissue or handkerchiefs. Further, reducing the number of plies results in economical and environmental benefits, as similar or even better properties are obtained while using less paper fiber.

Other advantages will become apparent from the hereinafter description.

BRIEF DESCRIPTION OF THE DRAWINGS

Embodiments of the invention are illustrated by way of examples and not limited to the accompanying drawings, in which like references indicate similar elements.

DETAILED DESCRIPTION OF PREFERRED EMBODIMENTS

FIGS. 1 to 4 are side cross-section views schematically illustrating the layer structure of embodiments of multi-ply tissue paper products.

Figure 1:
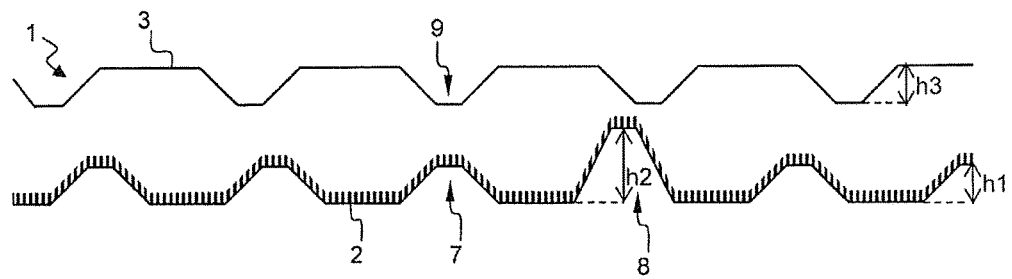
FIGS. 1 to 4 are side cross-section views of four embodiments of multi-ply tissue paper product, respectively.

FIG. 1 schematically illustrates a first embodiment of a multi-ply tissue paper product 1. It includes a first structured ply 2 and a second wet press ply 3. Each of these plies is made of tissue paper base-sheet having a low basis weight, in the range from 10 to 45 $g/m^2$. The structured ply 2 may be a through air dried ply produced by a through air drying TAD manufacturing method. Alternatively to the through air drying TAD manufacturing method, other manufacturing method like the advanced tissue molding system ATMOS manufacturing method that generate a similarly structured ply may be used. The wet pressed ply 3 is produced by a wet press CWP manufacturing method.

After the structured ply 2 has been produced by a paper making machine, a converting operation takes place. The converting operation includes micro-embossing the structured ply 2 on substantially at least 80% of its surface. The structured ply 2 may be embossed on substantially all its surface.

The structured ply 2 may be provided with a first microstructure pattern at two levels, namely combining a series of first 7 and second 8 protuberances. For example, the second protuberances 8 may be obtained by embossing the structured ply 2 at a second height h2 ranging from 1 to 3 times greater than the first height h1, for example 1.4 times greater. The density of the first protuberances 7 is greater than the density of the second protuberances 8.

The wet pressed ply 3 may be provided with a second microstructure pattern at one level, namely with a series of third protuberances 9. The third protuberances 9 may have a third height h3 that may be for example substantially identical to the first height h1.

As an example, the first height h1 may range from approximately 0.5 to 0.7 mm and the second height h2 from approximately 0.7 to 1 mm. The density of the series of first protuberances 7 and third protuberances 9 may range from approximately 30 to 100 protuberances/$cm^2$. The density of the series of second protuberances 8 may be 5 to 10 times less than the density of the series of first protuberances 7. The surface of a second protuberance 8 may be approximately between 0.5 to 2 $mm^2$. The series of second protuberances 8 may form a decorative motif (flower, leaf, brand name, etc. . . . ) that may be repeated on the surface of the outer ply.

Alternatively, one of the microstructure pattern may include a series of elongated protuberances having a density ranging from approximately 30 to 100 protuberances/$cm^2$. The elongated protuberances may have a length approximately 3 to 20 times longer than the length of the protuberances of the first series of protuberances.

Figure 2:
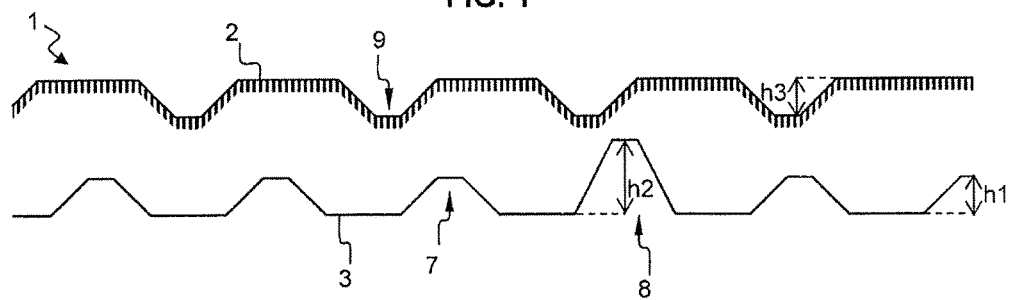

FIG. 2 schematically illustrates a second embodiment of a multi-ply tissue paper product 1. The second embodiment differs from the first embodiment in that the first structured ply 2 is provided with the second microstructure pattern at one level (series of third protuberances 9), while the second wet press ply 3 is provided with the first microstructure pattern at two levels (combining a series of first 7 and second 8 protuberances).

Figure 3:
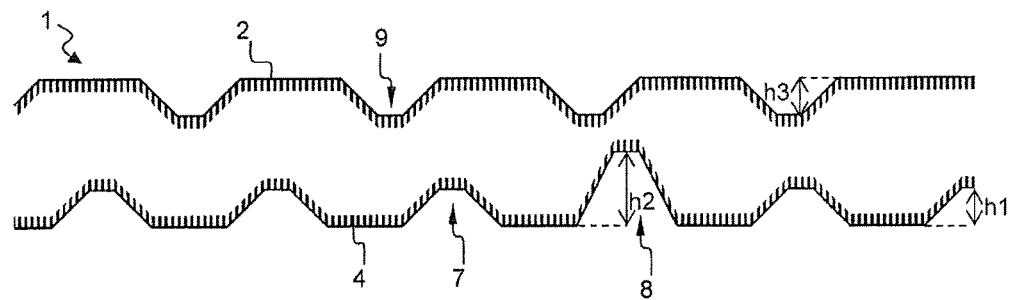

FIG. 3 schematically illustrates a third embodiment of a multi-ply tissue paper product 1. The third embodiment differs from the first embodiment in that the wet press ply 3 has been replaced by a second structured ply 4.

Figure 4:
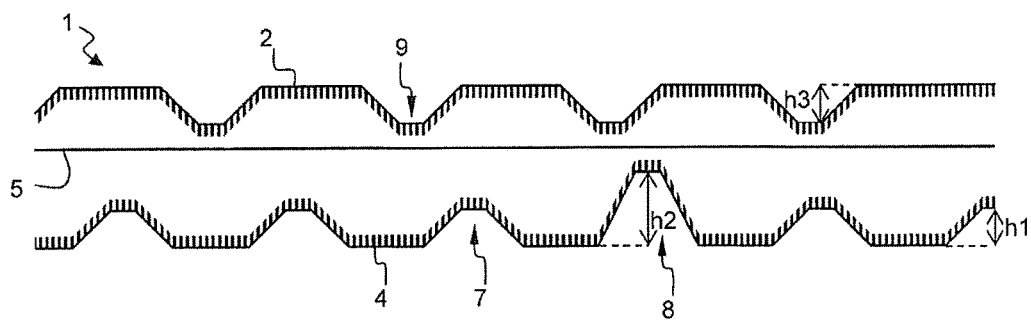

FIG. 4 schematically illustrates a fourth embodiment of a multi-ply tissue paper product 1. The fourth embodiment includes two structured plies 2 and 4 and one wet press ply 5. The two structured plies 2 and 4 form the outer plies of the multi-ply tissue paper product 1. The wet press ply 5 is positioned as an intermediate and central ply within the multi-ply tissue paper product 1. The wet press ply 5 may be not-embossed (as illustrated in FIG. 4) or, alternatively, embossed with any of the microstructure patterns hereinbefore presented (not shown).

Surprisingly, it was found that if the outer structured TAD ply is micro-embossed during the converting operation once dried after the tissue paper has been produced by the paper machine, the suppleness and/or softness would be substantially improved. This surprising effect is in contradistinction with the common knowledge until now as hereinafter illustrated by the graphics.

Figure 5:
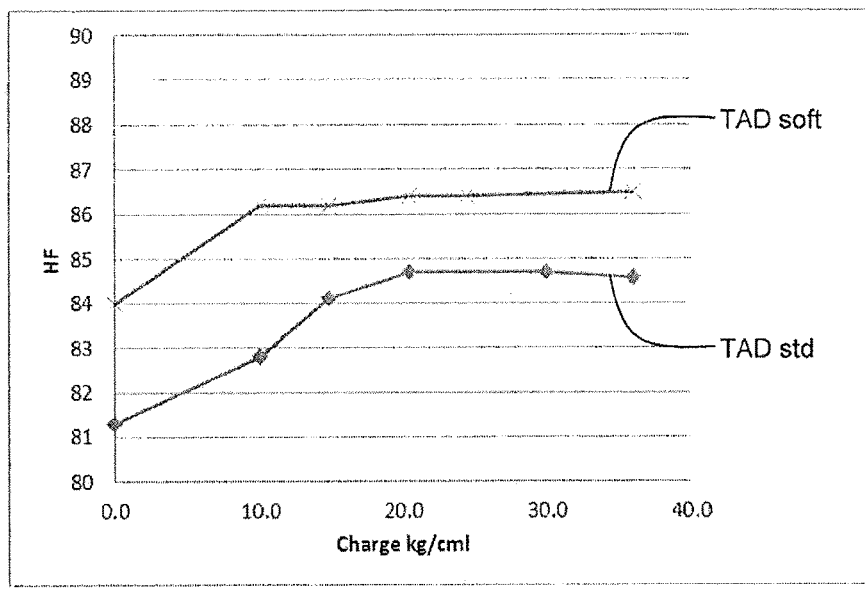
FIG. 5 is a graphic illustrating the effect of the micro-embossing pressure onto the hand-feel/softness.
Figure 9:
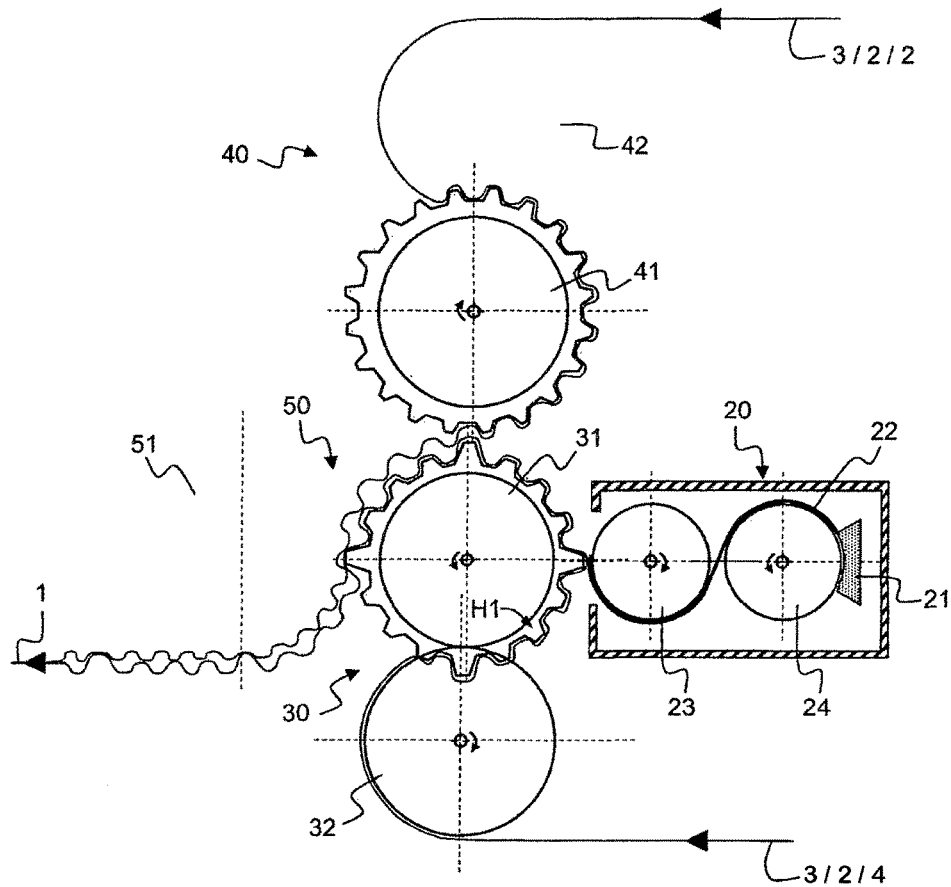
FIG. 9 schematically and partially illustrates an example of a converting assembly and method for manufacturing the multi-ply tissue paper product according to the first, second and third embodiment.

FIG. 5 is a graphic illustrating the effect of the micro-embossing pressure (charge in kg/cm linear) onto the hand-feel/softness HF. The protocol of test includes embossing the TAD structured ply between a steel cylinder and a rubber cylinder with a micro-embossing pattern having a density of 80 protuberances/cm$^2$. Firstly, a reference is produced by processing the tissue product into a converting assembly (as depicted in FIG. 9) without embossing the tissue product. This reference relates to hand-feel/softness measurement made at 0 kg/cm linear. Subsequently, multiple samples are produced by processing the tissue product into a converting assembly (as depicted in FIG. 9) and embossing the tissue product by applying an increasing embossing pressure.

The softness of the resulting tissue product is measured by a tissue softness analyzer of the company EMTEC. The tissue softness analyzer operates as follows in order to determine a softness value or a hand-feel value combining "real" softness, smoothness/roughness and stiffness. The tissue product sample is positioned and secured in a measuring cell, e.g. like a drumhead. Below is placed a vibration sensor, above is placed a vertical movable measuring head with a rotating blade, which is pushed onto the tissue product sample with a defined load. Then a rotation of the rotating blades with a defined speed is executed. The motion of the blades over the tissue product sample generates different types of vibrations/noise, which are detected by means of the vibration sensor. The resulting vibrations/noise spectrum is an overlapping of two single spectra. The first peak of the spectrum represents the smoothness/roughness (vertical vibrations of the tissue product sample like a membrane, caused by the motion of the blades over the tissue product sample surface). The second peak of the spectrum represents the "real" softness (horizontal vibrations of the blades itself caused by momentary blocking and swinging back of the blades by the fibers of the tissue product sample, when moving over the surface). Further, the tissue product sample is deformed to measure elastic, visco-elastic and plastic properties (stiffness). The three parameters softness, smoothness and stiffness are combined together with the caliper, grammage and number of plies with different algorithms and results in a hand-feel value HF. In particular, an algorithm used for the measurements is referred as the QA1 algorithm by EMTEC. The higher the hand-feel value, the softer is the tissue product. A mathematical equation can be created such that the results correlate with a certain reference panel of consumers by using specific algorithms for each material (base tissue, toilet paper, facials, etc. . . . ).

The graphic illustrates that an equivalent hand-feel/softness can be reached with an embossed standard TAD ply compared to a soft TAD ply (though having less strength) obtained through the paper making process. Further, by embossing the soft TAD ply, a gain in hand-feel/softness is also to be noticed. Furthermore, by embossing the TAD ply over a determined embossing pressure, namely around 10 and 20 kg/cm linear for soft TAD ply and standard TAD ply, respectively, the effect on hand-feel/softness is nil, at least decreases significantly.

Figure 6:
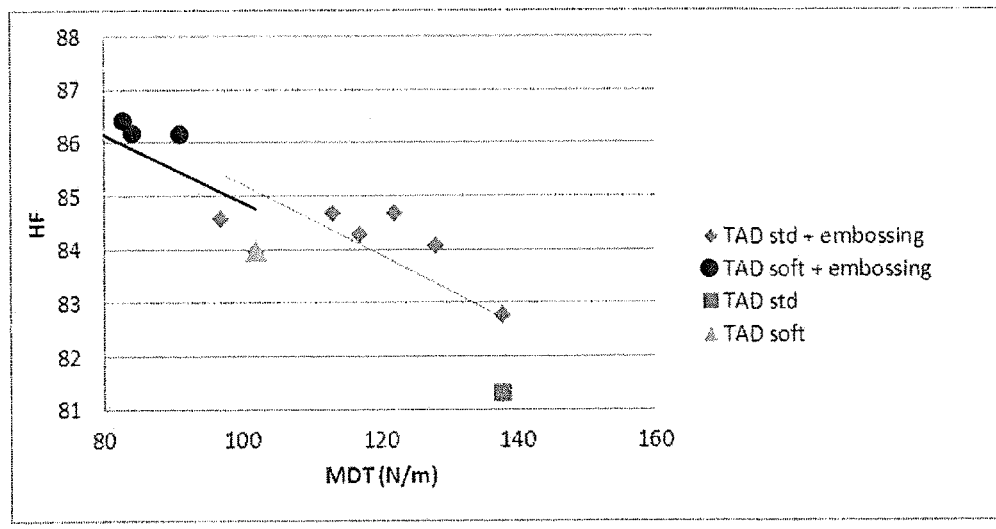
FIG. 6 is a graphic illustrating the effect of the micro-embossing onto the machine direction strength.

FIG. 6 is a graphic illustrating the effect of the micro-embossing onto the strength (Machine Direction Tensile MDT). The MD strength (dry strength) is measured according to the standard EN ISO 12625-4:2005. The graphic shows that, for an equivalent hand-feel/softness, an embossed standard TAD ply has more strength than an embossed soft TAD. Though not shown, the effect on the cross machine CD strength is similar. Thus, with the described method, it is possible to adjust the strength related property of the TAD ply in a given range without modifying the hand-feel/softness of the resulting product.

Figure 7:
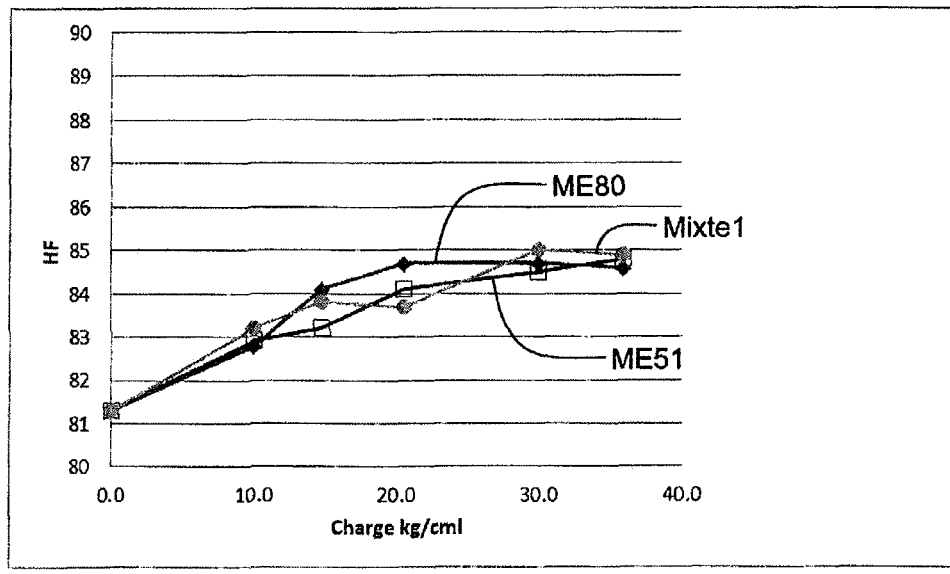
FIG. 7 is a graphic illustrating the effect of various micro-embossing patterns onto the hand-feel/softness.

FIG. 7 is a graphic illustrating the effect of various micro-embossing patterns onto the softness. Various microstructure patterns have been tested with the same tissue product, namely a first pattern ME80 including a density of 80 protuberances/cm$^2$, a second pattern ME51 including 51 protuberances/cm$^2$ and a third pattern Mixte1 including a combination of a series of elongated protuberances and a series of rounded protuberances. The graphic illustrates that independently of the pattern used to micro-emboss the TAD structured ply, the softness of the TAD structured ply is improved by the micro-embossing. The graphic is coherent with the graphic of FIG. 5 and further shows that greater is the micro-embossing pressure, greater is the softness in a limited range (above approximately 30 kg/cm linear, there is a stabilization in the softness improvement).

Figure 8:
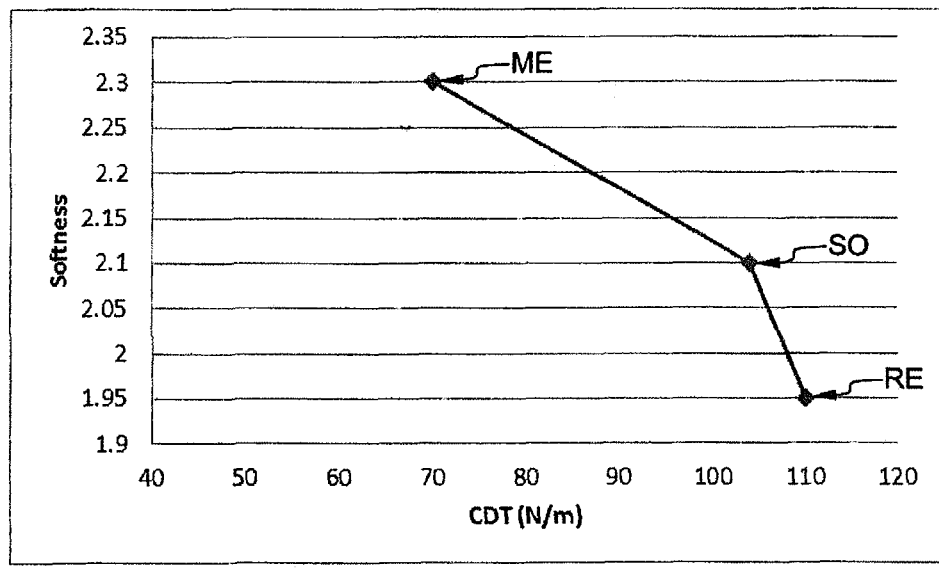
FIG. 8 is a graphic illustrating the softness gain with the third embodiment.

FIG. 8 is a graphic illustrating the softness gain with a third embodiment a multi-ply tissue paper product. In this graphic, the softness value is obtained from a blind test using a panel of consumers testing various multi-ply tissue paper products. Similar results are obtained by means of a measurement by the tissue softness analyzer of the company EMTEC. The reference point RE indicates the softness related property relatively to the strength related property of a tissue product including two standard TAD plies (namely including TAD plies obtained with a standard through air drying manufacturing process). The point SO indicates the softness related property relatively to the strength related property of a tissue product including two softest possible TAD plies (namely including TAD plies obtained with a softest possible papermaking manufacturing process). The point ME indicates the softness related property relatively to the strength related property of a tissue product including two micro-embossed TAD plies obtained according to the described method. With the described method, a significant gain in softness is obtained while maintaining the strength (Cross Machine Tensile CD) at an acceptable value. The CD strength (dry strength) is measured according to the standard EN ISO 12625-4:2005. Though not shown, the effect on the Machine Direction Tensile MDT strength is similar. Further, with the described method, it is possible to adjust the strength related property of the TAD ply in a determined range (70 to 105 N/m) while maintaining the softness of the resulting product in an softness range (2.1 to 2.3) better than standard TAD ply or softest possible TAD ply resulting only from the papermaking process.

The softness improvement that has been noticed as a surprising effect seems to result from the micro-embossing step that mechanically breaks the link between the fibers.

FIG. 9 schematically and partially illustrates an example of a converting assembly and method for manufacturing the multi-ply tissue paper product 1 of the first to third embodiment (depicted in FIGS. 1-3). The converting assembly includes a glue dispenser 20, a first embossing unit 30, a second embossing unit 40 and a joining unit 50. The converting assembly and the converting method for manufacturing such a multi-ply tissue paper product that will be explained in details hereinafter is based on a facility designed for manufacturing a conventional, nested two or three ply paper product without requiring substantial changes in components or adjustments (nested flat internal ply process as described in EP 1 081 284). Thus, manufacturing the multi-ply tissue paper product based on an existing converting assembly is particularly cost effective.

The first embossing unit 30 includes an engraved cylinder 31 and a mating rubber cylinder 32, both rotating in opposite directions. The cylinder 31 is engraved with a microstructure pattern combining first embossing tips of height H1 and second embossing tips of height H2. The first embossing tips are shallower than the second embossing tips. The first outer ply 2 (embodiment of FIG. 1), 3 (embodiment of FIG. 2) or 4 (embodiment of FIG. 3) is embossed in the first embossing apparatus 30. The engraved cylinder 31 enables performing a double-level engraving. The obtained embossed first outer ply 2 (embodiment of FIG. 1), 3 (embodiment of FIG. 2) or 4 (embodiment of FIG. 3) includes at least partly high discrete protuberances of height h2 (for example discrete truncated protuberances and/or linear protuberances such as flowers), and low protuberances of height h1 (for example discrete truncated protuberances). The heights h1 and h2 depend on the heights H1 and H2 of the engravings and also on the other embossing parameters, namely pressure, rubber quality, etc. . . . .

The microstructure pattern may include punctual or elongated corrugations, undulations, wave-like profiles, pyramid or cone based micro-embossments, truncated pyramid or truncated cone micro-embossments.

As an example, the first embossing tips on the cylinder 31 have an engraving height H1 between 0.2 and 2 mm and the second embossing tips on the cylinder 31 have an engraving height H2 such that the height difference H2–H1 is between 0.1 and 0.7 mm. The microstructure patterns may have a density higher than 30 protuberances/cm$^2$.

The glue dispenser 20 applies an adhesive 22 to the external side of the outer ply 2 (embodiment of FIG. 1), 3 (embodiment of FIG. 2) or 4 (embodiment of FIG. 3). The adhesive 22 may be applied to the external side of the outer ply opposite the distal areas of the protuberances of height h2 of the embossed first outer ply.

The glue dispenser 20 includes a vat 21, an applicator cylinder 23 and a dipping cylinder 24. The applicator cylinder 23 abuts the superposed through air dried ply 10 and the embossed first outer ply 2 (embodiment of FIG. 1), 3 (embodiment of FIG. 2) or 4 (embodiment of FIG. 3) against the engraved cylinder 31. The dipping cylinder 24 picks up the adhesive 22 in the vat 21 and transfers the adhesive 22 to the applicator cylinder 23. The applicator cylinder 23 is arranged to exercise a determined pressure on the engraved cylinder 31 at the distal area of the protuberances of height h2 of the embossed first outer ply. At said determined pressure, the adhesive 22 crosses the embossed first outer ply. Alternatively, the applicator cylinder 23 may be fitted with an engraved surface so as to apply the adhesive 22 only to part of the protuberances. This enables providing smoothness to the multi-ply tissue paper product 1.

Because the gluing areas are limited to the distal planar areas of the high protuberances of the embossed first outer ply, the resulting stiffness of the multi-ply tissue paper product 1 can be predetermined. Thus, the resulting stiffness may be adjusted. FIG. 9 only illustrates a particular example including a rate of one high protuberance for three shallow protuberances.

The adhesive 22 may be a polyvinyl acetate glue or a hot-melt glue. The adhesive may be diluted in water according to a proportion enabling an appropriate transfer to the various plies.

Substantially simultaneously to the formation of the embossed first outer ply 2 (embodiment of FIG. 1), 3 (embodiment of FIG. 2) or 4 (embodiment of FIG. 3), the second outer ply 3 (embodiment of FIG. 1) or 2 (embodiments of FIGS. 2 and 3) is embossed in the second embossing apparatus 40.

The second embossing unit 40 includes an engraved cylinder 41 and a mating rubber cylinder 42, both rotating in opposite directions. The cylinder 41 is engraved with a microstructure pattern having embossing tips of height H3. The height H3 may be substantially equal to the height H1.

The resulting second outer ply 3 (embodiment of FIG. 1) or 2 (embodiments of FIGS. 2 and 3) includes at least partly low discrete protuberances of height h3. The second engraved cylinder 41 may also include an aesthetic pattern (for example a decorative motif comprising flowers).

Figure 10:
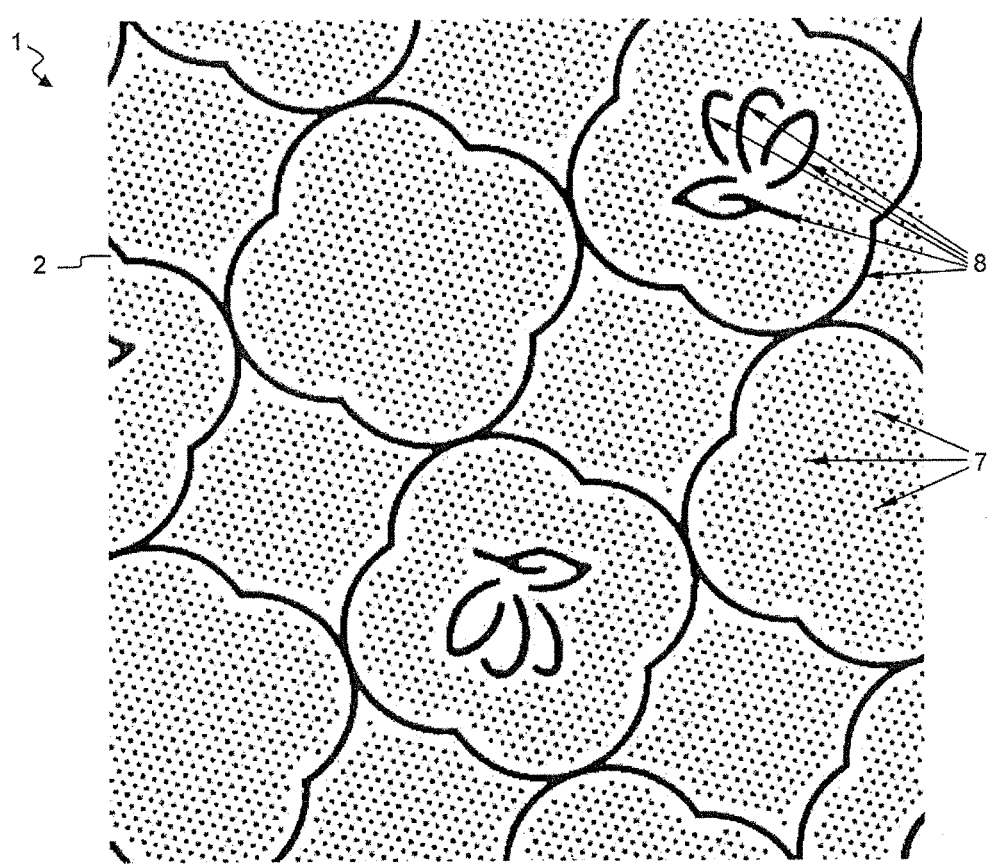
FIG. 10 is a top view of an embodiment of a multi-ply tissue paper product schematically illustrating an example of aesthetic pattern.

FIG. 10 is a top view of the resulting second outer ply 2 schematically illustrating an example of such an aesthetic pattern including a first series of protuberances 7 (protuberances of important density) and a second series of protuberances 8 (flower).

Subsequently, the embossed first outer ply 2 (embodiment of FIG. 1), 3 (embodiment of FIG. 2) or 4 (embodiment of FIG. 3), and the embossed second outer ply 3 (embodiment of FIG. 1) or 2 (embodiments of FIGS. 2 and 3) are joined together in a nesting mode in the joining unit 50.

The joining unit 50 includes a marrying cylinder 51 working in cooperation with the engraved cylinder 31 of the first embossing unit 30. The surface of the marrying cylinder 51 may be smooth. Alternatively, it may also be engraved and may include gaps in order to adjust the surface of joining and the final multi-ply tissue paper product smoothness.

The joining of the embossed first outer ply to the embossed second outer ply is carried out in such a manner that:
  on the one hand, the distal areas of the high protuberances of the embossed first outer ply nest at least partly with the distal areas of the protuberances of the embossed second outer ply, and
  on the other hand, sufficient pressure is applied to bond the two plies 3 and 2, 2 on one side, and 3, or 2 and 4 on the other side with the help of the adhesive 22.

As an alternative to the glue dispenser 50 as illustrated in FIG. 9, the adhesive (e.g. a hot melt glue, an aqueous glue, etc. . . . ) may be sprayed by appropriate means on each of the sides of the first outer ply before it is joined with the second outer ply.

Then, the multi-ply tissue paper product may be wound onto a core 71 as a roll of sheet material 70, or may be stacked and folded into a package 81 as a folded sheet material 80. These operations are not germane to the present invention and will not be further described. The multi-ply tissue paper product may be used as paper towel, toilet tissue rolls, bathroom tissue, wiping tissue, kitchen tissue rolls, facial tissue or handkerchiefs, etc. . . . .

The converting assembly and method hereinbefore described can be easily adapted to manufacture the embodiment depicted in FIG. 4. The CWP intermediate ply 5 may be superposed on the protuberances of the embossed first outer ply 4 at the level of the engraved cylinder 31. The CWP intermediate ply 5 fits closely onto the high protuberances of the embossed first outer ply 4. It further remains substantially planar between two consecutive high protuberances. Alternatively, it may be supported by the planar areas of the shallow protuberances. Thus, the corresponding converting assembly and method will not be further described as it is based on the converting assembly and method depicted in FIG. 9.

Figure 11:
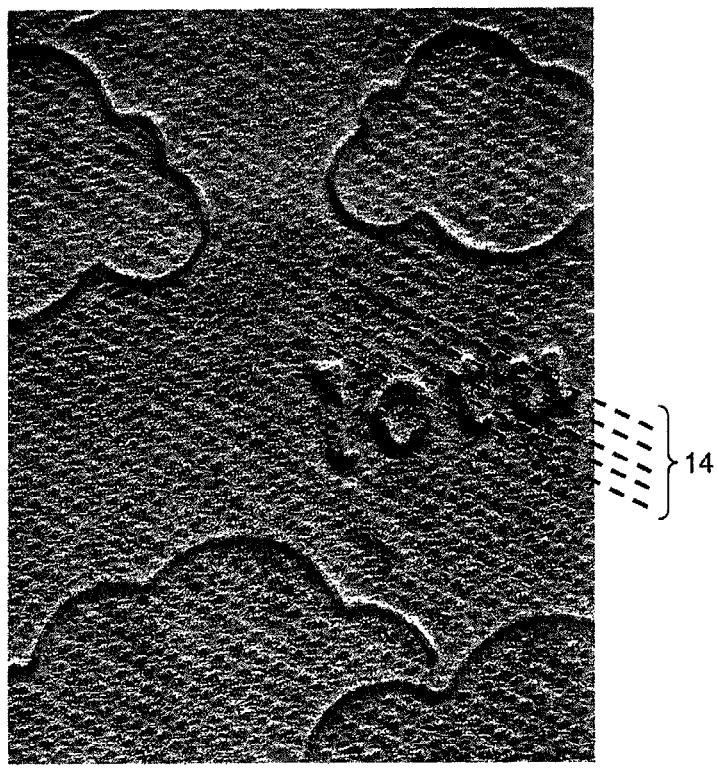
FIG. 11 is a top picture obtained with a microscope of a multi-ply tissue paper product according to the prior art.
Figure 12:
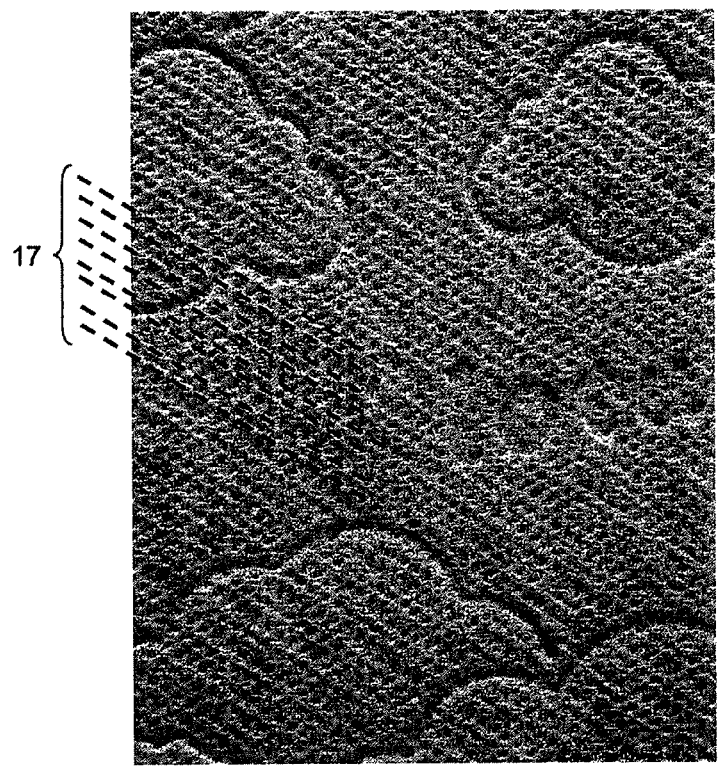
FIG. 12 is top picture obtained with a microscope of an embodiment of a multi-ply tissue paper product.

FIGS. 11 and 12 are top pictures obtained with a microscope of a multi-ply tissue paper product.

FIG. 11 shows the multi-ply tissue paper product manufactured according to the prior art. One can notice a regular pattern namely that all the protuberances are distributed along equidistant lines. Some of those equidistant lines are emphasized by dotted lines 14 in FIG. 11. This pattern results from the structuring manufacturing method (e.g. a through air drying TAD manufacturing method).

FIG. 12 shows a multi-ply tissue paper product manufactured according an embodiment of the invention. One can notice an irregular pattern, namely that the distances between lines of protuberances are irregular. Some of those lines are emphasized by dotted lines 17 in FIG. 12. This is due to the interference between the pattern resulting from the fabric used by the structuring manufacturing method (e.g. a through air drying TAD manufacturing method) and the pattern resulting from the additional micro-embossing operation taking place during the converting operation.

Thus, with the manufacturing method described herein, the papermaking process stays advantageously unchanged, only the converting process is affected by the additional micro-embossing operation. Thus, the described method enables a significant gain in softness of the final product is quite easy to implement on an existing industrial manufacturing line.

The drawings and their descriptions hereinbefore illustrate rather than limit the invention.

Though the invention has been described with respect to various embodiments of multi-ply tissue paper products including two and three plies, these are not limitative examples. The skilled person will readily recognize that the multi-ply tissue paper product may include more plies, e.g. four, five, six, etc. . . . provided that the structured outer ply is micro-embossed so as to confer a soft hand-feel to the tissue paper product.

The numbers, densities, positions and shapes of the micro-embossments in the depicted embodiments are non-limitative examples. The skilled person will readily recognize that these numbers, densities, positions and shapes may be changed if desired or deemed necessary with respect to, for example, the desired aesthetic effect to be achieved by the multi-ply tissue paper products.

Any reference sign in a claim should not be construed as limiting the claim. The word "comprising" does not exclude the presence of other elements than those listed in a claim. The word "a" or "an" or "at least one" preceding an element does not exclude the presence of a plurality of such element.

The invention claimed is:

1. A multi-ply tissue paper product comprising:
a first structured outer ply of tissue paper base-sheet being produced by a structuring manufacturing method selected from the group consisting of through air dried ply produced by a through air drying (TAD) manufacturing method, a dried ply produced by an advanced tissue molding system (ATMOS), and a dried ply produced by a structured tissue technology (SST) manufacturing method; and
a second structured ply of tissue paper base-sheet being through air dried ply produced by a structured manufacturing method selected from the group consisting of: TAD manufacturing method, ATMOS, and SST manufacturing method,
wherein:
the first structured outer ply comprises a first micro-embossed microstructure pattern on substantially at least 80% of the first structured outer ply surface, said micro-embossed microstructure pattern being applied by micro-embossing during a converting operation,
the second structured ply comprises a second micro-embossed microstructure pattern on substantially at least 80% of the second structured ply surface, and
the first micro-embossed microstructure pattern comprises a first series of protuberances having a density ranging from approximately 30 to 100 protuberances/cm$^2$.

2. The multi-ply tissue paper product of claim 1, further comprising at least another ply being a wet pressed ply produced by a conventional wet press (CWP) manufacturing method.

3. The multi-ply tissue paper product according to claim 2, wherein the wet pressed ply comprises another micro-embossed microstructure pattern.

4. The multi-ply tissue paper product according to claim 1, wherein the first microstructure pattern comprises a second series of protuberances forming a decorative motif, the protuberances of the second series having a height approximately 1 to 3 times greater than the height of the protuberances of the first series.

5. The multi-ply tissue paper product according to claim 4, wherein the first microstructure pattern further comprises a third series of elongated protuberances having a density ranging from approximately 30 to 100 protuberances/cm$^2$, the elongated protuberances having a length approximately 3 to 20 times longer than the length of the protuberances of the first or second series.

6. The multi-ply tissue paper product according to claim 4, wherein the protuberances of the first microstructure patterns are chosen from the group of microstructure patterns consisting of corrugations, undulations, wave-like profiles, pyramid or cone based micro-embossments, and truncated pyramid or truncated cone micro-embossments.

7. The multi-ply tissue paper product according to claim 1, wherein the first structured outer ply and the second structured ply are bonded together according to a nested or random nested manufacturing process.

8. A roll of sheet material comprising the multi-ply tissue paper product according to claim 1 wound onto a core.

9. A folded sheet material comprising the multi-ply tissue paper product according to claim 1 cut, stacked and folded into a package.

10. The multi-ply tissue paper product according to claim 1 in the form of a paper towel, toilet tissue roll, bathroom tissue, wiping tissue, kitchen tissue roll, facial tissue, or handkerchief.

11. A multi-ply tissue paper product comprising:
a first structured outer ply of tissue paper base-sheet being produced by a structuring manufacturing method selected from the group consisting of through air dried ply produced by a through air drying (TAD) manufacturing method, a dried ply produced by an advanced tissue molding system (ATMOS), and a dried ply produced by a structured tissue technology (SST) manufacturing method; and
a second structured ply of tissue paper base-sheet being through air dried ply produced by a structured manufacturing method selected from the group consisting of: TAD manufacturing method, ATMOS, and SST manufacturing method,
wherein:
the first structured outer ply comprises a first or second micro-embossed microstructure pattern on substantially at least 80% of the first structured outer ply surface, said first or second micro-embossed microstructure pattern being applied by micro-embossing during a converting operation,
the second structured ply comprises the first microstructure pattern when the first structured outer ply comprises the second microstructure pattern, or the second structured ply comprises the second microstructure pattern when the first structured outer ply comprises the first microstructure pattern,
the first microstructure pattern comprises a first series of protuberances having a density ranging from approximately 30 to 100 protuberances/cm$^2$ and a second series of protuberances having a height different from the height of the first series of protuberances, and
the second microstructure pattern comprises a third series of protuberances.

12. The multi-ply tissue paper product of claim 11, further comprising at least another ply being a wet pressed ply produced by a conventional wet press (CWP) manufacturing method.

13. The multi-ply tissue paper product according to claim 11, wherein the first microstructure pattern further comprises series of elongated protuberances having a density ranging from approximately 30 to 100 protuberances/cm$^2$, the elongated protuberances having a length approximately 3 to 20 times longer than the length of the protuberances of the first or second series.

14. A roll of sheet material comprising the multi-ply tissue paper product according to claim 11 wound onto a core.

15. A folded sheet material comprising the multi-ply tissue paper product according to claim 11 cut, stacked and folded into a package.

16. The multi-ply tissue paper product according to claim 11 in the form of a paper towel, toilet tissue roll, bathroom tissue, wiping tissue, kitchen tissue roll, facial tissue, or handkerchief.

17. A method for manufacturing a multi-ply tissue paper product comprising a first structured ply and a second structured ply each of which is made of tissue paper base-sheet, wherein the manufacturing method comprises:
manufacturing the first structured outer ply by a structuring manufacturing method selected from the group consisting of through air dried ply produced by a through air drying (TAD) manufacturing method, a dried ply produced by an advanced tissue molding system (ATMOS), and a dried ply produced by a structured tissue technology (SST) manufacturing method; and
manufacturing a second structured ply of tissue paper base-sheet being through air dried ply produced by a structured manufacturing method selected from the group consisting of: TAD manufacturing method, ATMOS, and SST manufacturing method,
micro-embossing a first micro-embossed microstructure pattern on the first structured outer ply on substantially at least 80% of the first structured outer ply surface during a converting operation,
micro-embossing a second micro-embossed microstructure pattern on the second structured ply on substantially at least 80% of the second structured ply surface,
wherein the first structured outer ply is microembossed between a first cylinder and a second cylinder engraved with a first microstructure pattern comprising a series of protuberances having a density ranging from approximately 30 to 100 protuberances/cm$^2$, and
wherein the first and second micro-embossed structured plies are joined to form the multi-ply tissue paper.

18. The multi-ply tissue paper product manufacturing method of claim 17, further comprising, during the micro-embossing of the first structured outer ply, adjusting a micro-embossing pressure applied to the first structured outer ply such as to adjust a softness related property relative to a strength related property of the first structured outer ply in a defined range.

19. The multi-ply tissue paper product manufacturing method of claim 18, wherein the micro-embossing pressure ranges from approximately 10 to 40 kg/cm linear such as to adjust the softness related property of the first structured outer ply between approximately 83 and 87 according to measurements provided by an EMTEC tissue softness analyzer, and a machine direction strength MDT related property of the first structured outer ply between approximately 90 and 130 N/m measured according to the standard EN ISO 12625-4:2005.

20. The multi-ply tissue paper product manufacturing method according to claim 17, further comprising manufacturing at least another ply as a wet pressed ply produced by a wet press manufacturing method.

* * * * *